United States Patent [19]

Reitmeier et al.

[11] 4,380,069

[45] Apr. 12, 1983

[54] DIGITAL ERROR DETECTION USING BRACKETING

[76] Inventors: Glenn A. Reitmeier, 3 Metekunk Dr., Trenton, N.J. 08638; Frank J. Marlowe, 20 Academy St., Kingston, N.J. 08528

[21] Appl. No.: 217,796

[22] Filed: Dec. 18, 1980

[51] Int. Cl.³ .............................................. G06F 11/12
[52] U.S. Cl. ........................................ 371/31; 371/65; 360/38.1; 358/314
[58] Field of Search ...................... 371/31, 65; 360/38; 358/8, 127

[56] References Cited

U.S. PATENT DOCUMENTS

| | | | |
|---|---|---|---|
| 3,569,934 | 3/1971 | Parr, Jr. ............................... | 371/31 |
| 4,232,340 | 11/1980 | Fuhrer ............................... | 360/38 X |
| 4,250,521 | 2/1981 | Wright ............................... | 358/8 |
| 4,315,331 | 2/1982 | Lemoine et al. ................. | 371/31 |

FOREIGN PATENT DOCUMENTS 2020140  11/1979  United Kingdom ................. 371/31

*Primary Examiner*—David H. Malzahn

[57] ABSTRACT

In a transmission channel, such as a tape recorder, errors in code words usually occur in bursts. Further, it is usually possible to detect only some of the erroneous code words. To conceal undetected erroneous code words, concealment starts before, and continues after, a detected erroneous code word. Thus the undetected erroneous code words in an error burst have a high probability of being concealed.

10 Claims, 3 Drawing Figures

DIGITAL ERROR DETECTION USING BRACKETING

BACKGROUND OF THE INVENTION

The present invention relates to error detection and correction, and more particularly to such correction as applied to burst errors.

Recently the field of digital television technology has been developed. In this technique, a video signal is sampled, typically at four times the color subcarrier frequency. Each sample ("pixel") is digitized, usually using an 8-bit code word, which provides 256 grey levels. Frequently, it is then desired to magnetically record the code words.

In the magnetic tape recording of digital data, various channel codes are used to perform the actual recording of the data. These channel codes transform one set of source waveforms, e.g. the above-described 8-bit code words, into another uniquely decodable set of waveforms which are better suited to the nonlinearities encountered in the magnetic tape channel. These channel codes are well known, and generally fall into two categories, phase codes and group codes. Phase codes alter the phase of transitions in the recorded signal as a function of the data to be recorded. Group codes are a one-to-one mapping between a set of source bits and a corresponding tape waveform.

A major consideration in recording is to minimize the DC content of the recorded waveform, because of the tape recorder's poor ability to recover low frequency information. In view of this, a new group code was recently designed by the Independent Broadcast Authority (IBA) specifically for the problem of recording digital video signals. The IBA found that there are 252 different combinations of 10 bits which have an equal number of 1's and 0's, that is, have a DC content of exactly zero. Thus, the IBA code is one which maps a data word consisting of 8 "source bits" to an on tape waveform with 10 "tape bits" per word, that is, 10 transitions. This is accomplished in such a manner so that the 256 on-tape words correspond to the 252 "no-DC" 10-bit words and 4 additional 10-bit words.

A simplified example is given below. In this example, it is assumed that 3-bit words are used for the digitization of the video samples (8 gray levels) and 6 bit "no DC content" words are used for the recording code.

| DIGITIZATION WORDS | RECORDING WORDS |
|---|---|
| 000 | 000111 |
| 001 | 111000 |
| 010 | 101010 |
| 011 | 010101 |
| 100 | 001011 |
| 101 | 110100 |
| 110 | 001110 |
| 111 | 110001 |

It should be noted that all of the recording words have an equal number of ones and zeros, i.e. have no DC content. The next higher even order code word length from the 3-bit source code word is, of course, 4-bits. However, there are only 6 no-DC code words among all of the 16 4-bit code words. Therefore it is necessary to go to the next higher order even order code word length, which is 6-bits. There are twenty no-DC code words among the 64 possible words in the group of 6-bit words, which is more than enough for the eight possible 3-bit source code words.

In addition to the poor low frequency response described above, another problem with magnetic recording and playback is errors, which errors usually occur in bursts as a result of dropouts. Since in the above-identified 6-bit recording word code, only eight out of a possible 64 6-bit code words are valid code words, seven eighths ($\frac{7}{8}$) of all possible errors can be detected, this still leaves the remaining one-eighth ($\frac{1}{8}$) of the errors undetected. Similarly, in the 10-bit IBA code about $2^8/2^{10} = \frac{3}{4}$ of all errors are detected leaving the $\frac{1}{4}$ of the errors undetected.

It is therefore desirable to conceal substantially all errors in a data channel and not just the detected errors.

SUMMARY OF THE INVENTION

Method and apparatus for handling data code words comprises detecting errors in said code words, estimating replacement code words both for said detected erroneous code words and for at least some code words within a selected interval of said erroneous words, and replacing said erroneous code word and said code words within said selected interval by said estimated code words respectively, whereby most undetected errors are thus concealed.

DETAILED DESCRIPTION

Figure 1:
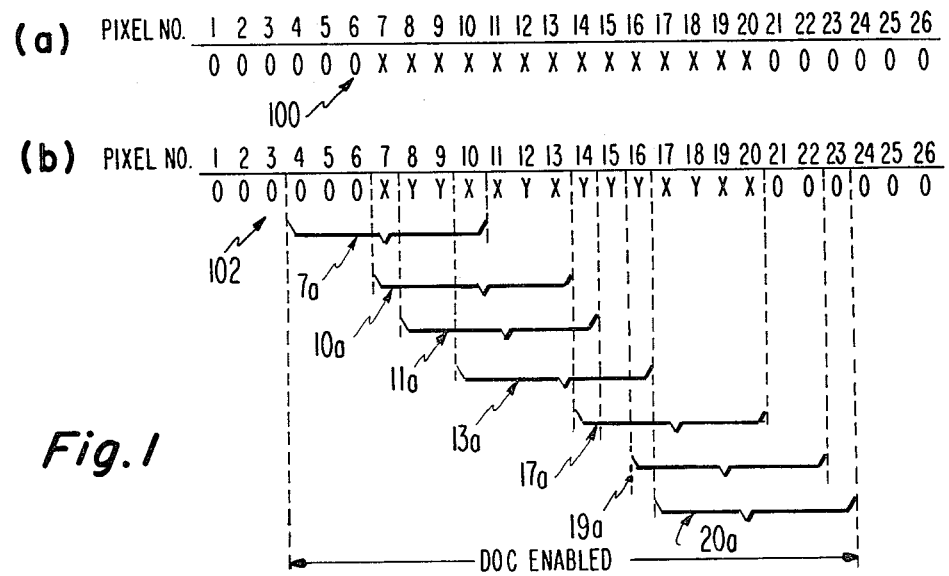
FIG. 1 shows error patterns in pixels and the operation of a dropout concealer in accordance with the invention.

FIG. 1 shows the concept of the invention. In FIG. 1a there is shown a consecutive stream 100 of reproduced pixels derived from a single television scanning line, with correctly reproduced pixels indicated by "O" and incorrectly reproduced pixels indicated by an "X". It is noted that the errors occur in a burst that is 14 pixels long. As explained above, the 10-bit IBA recording code will allow detection of three-fourths of all errors on the average when using a 8-bit digitizing code. However it is always possible that for any given burst less or more than this average will be detected. In FIG. 1b a worse case has been assumed, i.e. only one half of the errors are detected. These detected erroneous pixels are shown by an "X" in the stream 102, while the undetected erroneous pixels are shown by a "Y". As before in FIG. 1a, correct pixels are shown by a "O". Thus there are 7 Xs and 7 Ys.

Whenever an erroneous pixel is detected, a drop out compensator (DOC) is enabled. The DOC provides an estimate of an erroneous pixel from some selected combination of surrounding pixels and substitutes the estimate for the erroneous pixel. In accordance with the present invention, this procedure is carried out not only for the detected pixel in error, but for some selected number of pixels occurring before and after the detected erroneous pixel. In FIG. 1b the DOC is enabled for a total of 7 pixel periods surrounding each detected error, and thus 3 pixels before and 3 pixels after the detected erroneous pixel are also replaced with estimates derived from their respective surrounding pixels. This procedure is called "bracketing".

Referring to FIG. 1b in detail, the first detected error is in pixel 7 and thus the DOC is enabled for a duration indicated by bracket 7a. It will be appreciated that undetected erroneous pixels 8 and 9 are replaced by their respective estimates. Such a replacement also takes place for correct pixels 4, 5 and 6 but this does not noticeably affect the displayed picture. The next detected erroneous pixel that enables the DOC is pixel 10. The DOC is enabled for a duration indicated by bracket 10a. The DOC is also enabled by pixels 11, 13, 17, 19 and 20 as indicated by brackets 11a, 13a, 17a, 19a, and 20a respectively. Thus the DOC is continuously enabled throughout the interval bounded by pixels 4 and 23. It will be readily seen that all of the undetected erroneous pixels 8, 9, 12, 14, 15, 16 and 18 are replaced by their respective estimates. It will be appreciated that in the more typical situation where a higher number of errors are detected, there are more pixels that enable the DOC, thus increasing the probability that undetected errors are replaced with appropriate estimates.

Figure 2:
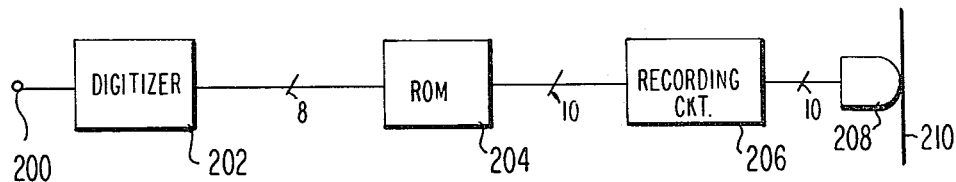
FIG. 2 is a block diagram of a recording system for use with the present invention.

FIG. 2 shows a recording arrangement. An input terminal 200 receives analog video signals from any source, e.g. a television camera, another recorder, broadcast signals that are received and detected, etc. The analog signals are applied to a digitizer 202 that samples and then quantizes the analog signal. The sampling preferably takes place at a frequency of 3 or 4 times the color subcarrier frequency, while the quantization is preferably to 8-bit accuracy. The 8-bit samples are applied to ROM 204 over an 8-bit parallel bus. ROM 204 maps the 8-bit samples into 252 10-bit code words that have equal number of ones and zeros plus an additional four 10-bit words. The 10-bit words are applied over a 10-bit parallel bus to recording circuit 206. Circuit 206 conventionally comprises amplifiers, bias oscillators, etc. The 10-bit words are then applied to 10-bit record head 208, i.e. 10 individual recording heads that record in parallel tracks on magnetic recording tape 210, the respective bits of the 10-bit words. If desired, the 10 bits that make up a single word could be serially recorded in a single track using an ordinary single recording head. However, then a parallel to serial converter would be required in FIG. 2 between circuit 206 and head 208.

Figure 3:
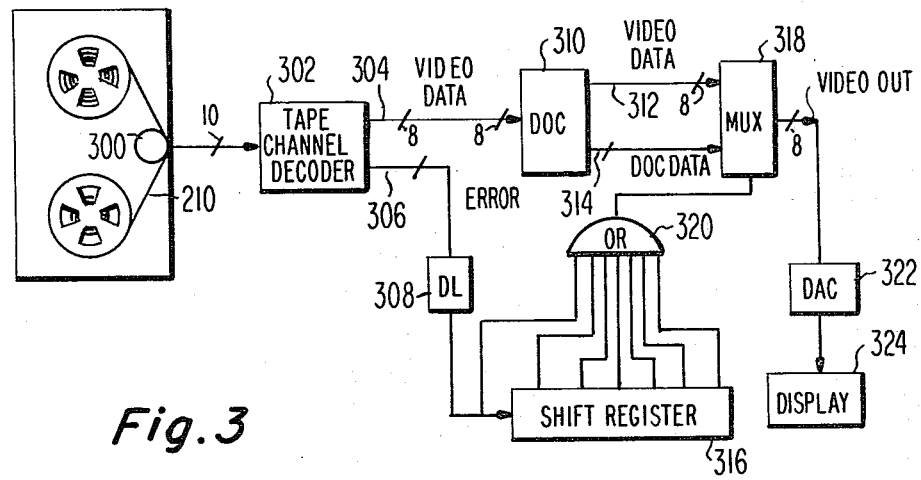
FIG. 3 is a block diagram of a reproducing system in accordance with the present invention.

FIG. 3 shows a circuit in accordance with the present invention to detect and conceal errors. The tape 210 is moved with respect to 10-bit reproducing head 300. The 10-bit words are successively applied to tape channel decoder 302 over a 10-bit bus. If serial recording were used, then head 300 would be a 1-bit head and series to 10-bit parallel converter would be required between head 300 and decoder 302. Decoder 302 comprises a ROM which maps each of the 10-bit words into the corresponding original 8-bit word that came from digitizer 202 provided that the 10-bit word matches one of the 256 valid 10-bit words. The 8-bit words are provided at 8-bit output 304. If the reproduced 10-bit word does not match one of the valid 10-bit words, an error signal is provided at output 306 to shift register 316 through delay line 308.

The 8-bit words at output 304 are applied to DOC (drop out compensator) 310. DOC 310 has two outputs 8-bit coupled to 8-bit MUX (eight pole double throw switch) 318. Output 313 provides an uncompensated 8-bit video signal, while output 314 provides a drop-out compensated signal. In the simplest embodiment, the compensated signal can be derived by replacing an erroneous pixel by a vertically adjacent pixel. Thus, DOC 310 could in this case be simply a delay line coupled between the DOC input and output 312 and having a delay of one horizontal line. Output 314 would be directly connected to the DOC input. This will replace an erroneous pixel with a pixel from the line below. Delay line 308 in this case must have a delay of one horizontal line minus one half of the delay of shift register 316. Other more accurate DOC's are known in the art, e.g. averaging of the two vertically adjacent pixels, and can be used in the present invention. In general, the substitution pixels are generated from combinations of pixels proximate the erroneous pixels.

Shift register 316 has a number of stages equal to the number of pixels in a bracket minus one, and thus comprises in the embodiment described six stages, which stages are clocked at the sampling frequency. The output of each stage is coupled to an input of OR gate 320. A high logic level signal at the output of gate 320 controls MUX 318 to apply the compensated signal at output 314 to a DAC (digital to analog converter) 322, otherwise the video data at output 312 is applied to DAC 322. In either case, the resulting analog output signal for DAC 322 is then applied to display 324.

When an erroneous pixel is detected by decoder 302, e.g. pixel No. 7 in FIG. 1, an error flag signal is present at output 306 and is applied to the first stage of shift register 316 through delay line 308. The delayed error flag signal from the output of delay line 308 is also applied directly to gate 320 to actuate MUX 318 to select the compensated output 314. It is noted that when the error flag signal occurs, and due to the delay of delay line 308, pixel No. 4 of the line above the line containing the erroneous pixel No. 7 was about to be supplied by output 312. For this pixel No. 4 from the line above, pixel No. 4 from the line below (or an average of the pixels No. 4 from lines above and below the line containing the erroneous pixel) is substituted. In other words, the purpose of delay line 308 is to compensate for the delay in DOC 310. The delay length of line 308 is whatever it needs to be depending on the particular configuration of DOC 310 to cause DOC 310 to start replacing pixel No. 4 when erroneous pixel No. 7 is detected. As the error flag signal is shifted through each stage of register 316, it causes pixels to be substituted for each of the next six pixels for a total of seven substituted pixels, i.e. pixel numbers 4 through 10 as shown by bracket 7a in FIG. 1b. If the next detected erroneous pixel is No. 10 (as was assumed in FIG. 1b) the DOC will be enabled for the duration indicated by bracket 10a. The same applies to the other detected erroneous pixels and their respective brackets indicating DOC enabling. It will be readily seen that the operation indicated in FIG. 1b is carried out by the apparatus of FIG. 3.

It will be appreciated that many other embodiments are possible within the spirit and scope of the invention. For example, codes other than IBA codes can be used to detect an error and actuate bracketing apparatus in accordance with the invention. Still further, methods of identifying erroneous code words other than invalid code word recognition can be used to actuate bracketing, e.g. parity error, signal amplitude loss, etc. Also, the invention can be applied to communications channels other than a tape recorder.

Further, as shown in U.S. Patent application Ser. No. 170,811, filed July 21, 1980, and assigned to the assignee of the present invention, sequentially occurring pixels can be recorded in different tracks using a serial-to-parallel converter. Four tracks are used in an embodiment described therein. Recording time delays are provided between tracks, which delays are longer than an expected drop out length. During reproduction inverse delays and a parallel-to-serial converter are provided to obtain the original sequential pixel order. If a burst type dropout occurs on tape, even one affecting all four tracks, only every fourth pixel will be affected when the reproduced pixels are rearranged in the original sequential order. The present invention can be used in such a system by changing the delay of each stage in shift register 316 to be equal to four pixel periods instead of one period as described above. Thus DOC enabling will occur for every fourth reproduced pixel, which pixels are actually sequential on the tape.

What is claimed is:

1. A method for handling data code words, said method comprising detecting erroneous code words, estimating replacement code words both for said detected erroneous code words and for at least some code words within a selected interval of said erroneous words, and replacing said erroneous code word and said code words within said selected interval by said estimated code words respectively, whereby most undetected errors are thus concealed.

2. An apparatus for handling data code words, said apparatus comprising detecting means for detecting erroneous code words, estimating means coupled to said detecting means for estimating replacement code words both for said detected erroneous code words and for at least some code words within a selected interval of said erroneous words, and replacing means coupled to said detecting means and said estimating means for replacing said erroneous code word and said code words within said selected interval by said estimated code words respectively, whereby most undetected errors are thus concealed.

3. An apparatus as claimed in claim 2, wherein said code words comprises equal numbers of ones and zeroes.

4. An apparatus as claimed in claim 2, wherein said detecting means comprises a read only memory.

5. An apparatus as claimed in claim 2, wherein said estimating means estimates said replacement code words from a selected combination of code words proximate the replaced code word.

6. An apparatus as claimed in claim 2, wherein said replacing means comprises a delay line coupled to said detecting means, a shift register coupled to said delay line, an OR gate coupled to said shift register, and a multiplexer coupled to said gate and to said estimating means.

7. An apparatus as claimed in claim 6, wherein said delay line has a delay of one television horizontal line period minus one half of the total delay of said shift register.

8. An apparatus as claimed in claim 2, wherein said data code words represent a television signal.

9. An apparatus as claimed in claim 2, further comprising a magnetic tape reproducing apparatus coupled to said detecting means.

10. An apparatus as claimed in claim 2, wherein said estimating means estimates replacement code words for all of said code words within said selected interval of said erroneous words.

* * * * *